United States Patent
Oh et al.

(10) Patent No.: US 10,996,200 B2
(45) Date of Patent: May 4, 2021

(54) METHOD OF DETERMINING POSITION OF FAULT OF EQUIPMENT USING SOUND SOURCE INPUTTING APPARATUS AND SYSTEM OF DETERMINING POSITION OF FAULT OF EQUIPMENT FOR PERFORMING THE SAME

(71) Applicant: SAMSUNG ELECTRONICS CO., LTD., Suwon-si (KR)

(72) Inventors: Kyoung-Whan Oh, Hwasung-si (KR); Won-Yup Ko, Seongnam-si (KR); Won-Ki Park, Seoul (KR); Ho-Youl Lee, Yongin-si (KR); Young-Il Jang, Yongin-si (KR); Yeon-Woo Choi, Suwon-si (KR); Yong-Won Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 306 days.

(21) Appl. No.: 16/055,409

(22) Filed: Aug. 6, 2018

(65) Prior Publication Data
US 2019/0137451 A1 May 9, 2019

(30) Foreign Application Priority Data
Nov. 9, 2017 (KR) .................. 10-2017-0149032

(51) Int. Cl.
*G01N 29/14* (2006.01)
*G01N 29/04* (2006.01)
(Continued)

(52) U.S. Cl.
CPC .......... *G01N 29/048* (2013.01); *G01N 29/14* (2013.01); *G01N 29/326* (2013.01); *G01N 29/34* (2013.01);
(Continued)

(58) Field of Classification Search
CPC ...... G01N 29/048; G01N 29/14; G01N 29/34; G01N 29/4436; G01N 2291/0289
See application file for complete search history.

(56) References Cited

U.S. PATENT DOCUMENTS 8,761,412 B2  6/2014  Hernandez-Abrego et al.
9,466,316 B2  10/2016  Christian
(Continued)

FOREIGN PATENT DOCUMENTS

JP     2004085455 A  *  3/2004
JP     5306561 B1      7/2013
(Continued)

OTHER PUBLICATIONS

JP-2004085455-A (Original), Mar. 18, 2004, 13 pp. (Year: 2004).*
(Continued)

*Primary Examiner* — Toan M Le
(74) *Attorney, Agent, or Firm* — Lee IP Law, PC

(57) ABSTRACT

A method for determining a position of a fault of equipment includes receiving a plurality of sound source signals from a plurality of sound source inputting apparatuses, determining an abnormal operation of the equipment by analyzing at least one sound source signal among the sound source signals, and extracting abnormal sound source signals from the sound source signals. The abnormal sound source signals are indicative of abnormal operation of the equipment. The method further includes determining a position of the abnormal operation based on a time difference between the abnormal sound source signals.

18 Claims, 9 Drawing Sheets

(51) Int. Cl.
*G01N 29/34* (2006.01)
*G01N 29/32* (2006.01)
*G01N 29/44* (2006.01)

(52) U.S. Cl.
CPC . *G01N 29/4436* (2013.01); *G01N 2291/0289* (2013.01)

(56) References Cited

U.S. PATENT DOCUMENTS

| | | |
|---|---|---|
| 2011/0087079 A1 | 4/2011 | Aarts |
| 2012/0143431 A1 | 6/2012 | Kim et al. |
| 2015/0143909 A1 | 5/2015 | Bien et al. |
| 2015/0221321 A1 | 8/2015 | Christian |
| 2016/0330557 A1 | 11/2016 | Christian et al. |
| 2017/0097323 A1 | 4/2017 | D'Souza et al. |

FOREIGN PATENT DOCUMENTS

| | | |
|---|---|---|
| JP | WO 2013/136472 A1 | 9/2013 |
| JP | 2017-096922 A | 6/2017 |
| KR | 10-0883446 B1 | 2/2009 |
| KR | 10-2011-0060632 A | 6/2011 |
| KR | 10-2015-0061906 A | 6/2015 |

OTHER PUBLICATIONS

JP-2004085455-A (English Translate), The Abnormal Sound Source Survey Method, Sound Source Survey Device, Mar. 18, 2004, 12 pp. (Year: 2004).*

JP-2004085455-A (Application Data), Mar. 18, 2004, 3 pp. (Year: 2004).*

* cited by examiner

At1 > Bt1
At2 < Bt2

At1 < Bt1
At2 > Bt2

METHOD OF DETERMINING POSITION OF FAULT OF EQUIPMENT USING SOUND SOURCE INPUTTING APPARATUS AND SYSTEM OF DETERMINING POSITION OF FAULT OF EQUIPMENT FOR PERFORMING THE SAME

CROSS-REFERENCE TO RELATED APPLICATION

Korean Patent Application No. 10-2017-0149032, filed on Nov. 9, 2017, and entitled, "Method of Determining Position of Fault of Equipment Using Sound Source Inputting Apparatus and System of Determining Position of Fault of Equipment for Performing the Same," is incorporated by reference herein in its entirety.

BACKGROUND

1. Field

One or more embodiments herein relate to a position determining apparatus.

2. Description of the Related Art

Attempts have been made to correct faults in equipment. However, those attempts are performed only after the fault has occurred in the equipment. This slows down the manufacturing process and introduces other inefficiencies such as but not limited to increased costs.

SUMMARY

In accordance with one or more embodiments, a method for determining a position of a fault of equipment includes receiving a plurality of sound source signals from a plurality of sound source inputting apparatuses; determining an abnormal operation of the equipment by analyzing at least one sound source signal among the sound source signals; extracting abnormal sound source signals from the sound source signals, the abnormal sound source signals indicative of abnormal operation of the equipment; and determining a position of the abnormal operation based on a time difference between the abnormal sound source signals.

In accordance with one or more other embodiments, a system for determining a position of a fault of equipment includes a plurality of sound source inputting apparatuses; a sound source analyzer to determine an abnormal operation of the equipment, the sound source analyzer to analyze at least one sound source signal among a plurality of sound source signals received by the sound source inputting apparatuses; and position determining logic to determine a position of the abnormal operation based on a time difference between abnormal sound source signals extracted from the sound source signals and which indicate abnormal operation of the equipment.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
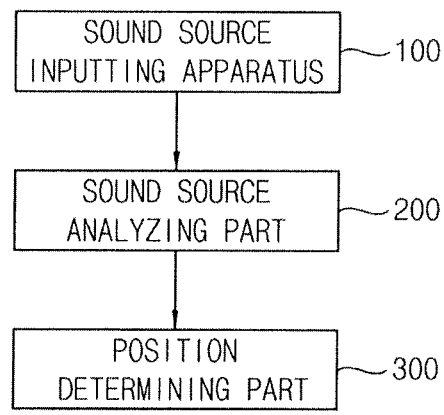
FIG. 1 illustrates an embodiment of a system for determining the position of a fault of equipment.

FIG. 1 illustrates an embodiment of a system for determining the position of a fault of equipment. Referring to FIG. 1, the system includes a sound source inputting apparatus 100, a sound source analyzing part (analyzer) 200, and a position determining part (logic) 300. In one embodiment, the system may include a plurality of sound source inputting apparatuses 100. The sound source inputting apparatus(es) may be, for example, a microphone, a recorder, and/or an acoustic emission sensor.

The sound source inputting apparatuses 100 are in the equipment. Sound source signals are respectively input to the sound source inputting apparatuses 100 in the equipment. Each of the sound source inputting apparatuses 100 transmit the input sound source signals to the sound source analyzing part 200.

The system for determining the position of the fault of the equipment may further include a sound source generating apparatus adjacent to the sound source inputting apparatus 100. The sound source generated by the sound source generating apparatus is input to the sound source inputting apparatus 100 so that a status of the equipment and a distance between a portion of the equipment and the sound source inputting apparatus 100 may be determined.

The sound source analyzing part 200 analyzes the sound source signals input to the sound source inputting apparatus 100. The sound source analyzing part 200 analyzes at least one of the sound source signals to determine the abnormal operation of the equipment.

The sound source analyzing part 200 may extract abnormal sound source signals representing the abnormal operation of the equipment from the sound source signals. The sound source analyzing part 200 outputs the abnormal sound source signals to the position determining part 300.

The position determining part 300 determines the position of the abnormal operation based on the time difference of the abnormal sound source signals. For example, the position determining part 300 may determine start points of the abnormal sound source signals. In one embodiment, the position determining part 300 may determine end points of the abnormal sound source signals.

For example, the position determining part 300 may determine the position of the abnormal operation based only on the time difference of the start points of the abnormal sound source signals. In one embodiment, the position determining part 300 may determine the position of the abnormal operation based on the time difference of the start points of the abnormal sound source signals and the time difference of the end points of the abnormal sound source signals.

FIGS. 2 to 5 illustrates conceptual diagrams of how the position determining part 300 of FIG. 1 may operate according to some embodiments. The system for determining the position of the fault of the equipment may include a first sound source inputting apparatus MIC1, a second sound source inputting apparatus MIC2, and a third sound source inputting apparatus MIC3.

Figure 2:
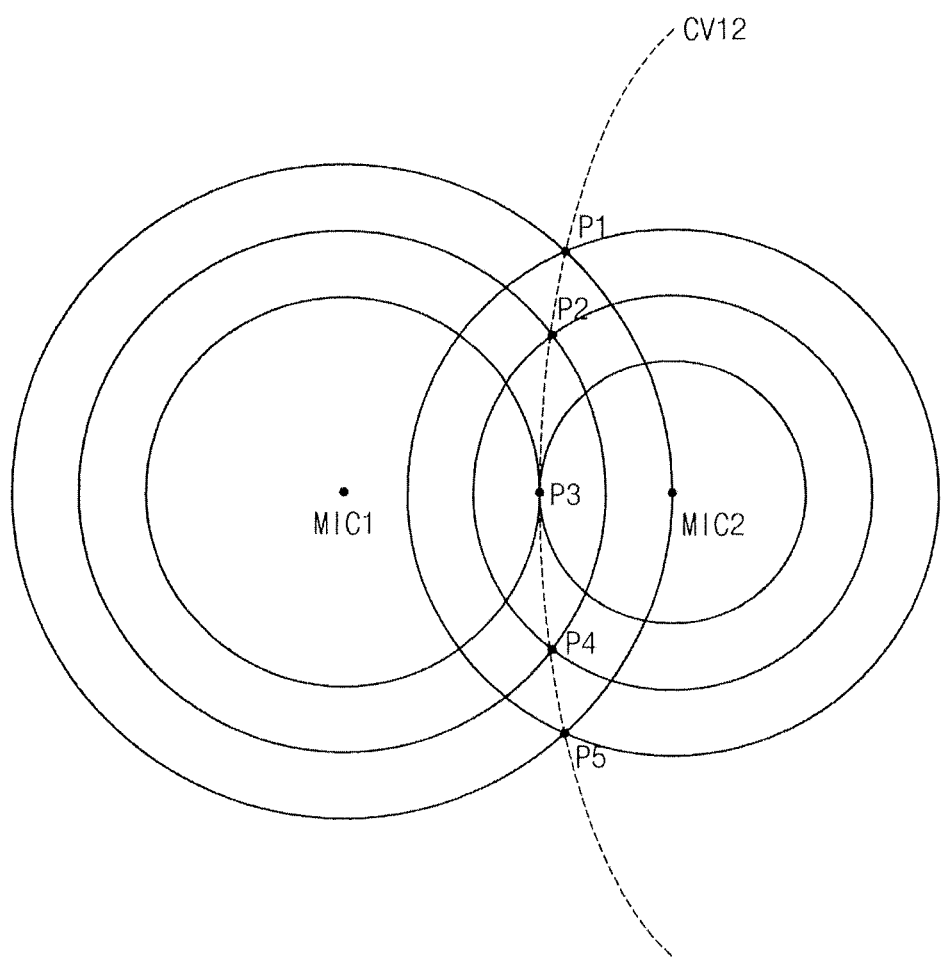
FIGS. 2 to 5 illustrate various embodiments of how a position determining part operates.
Figure 3:
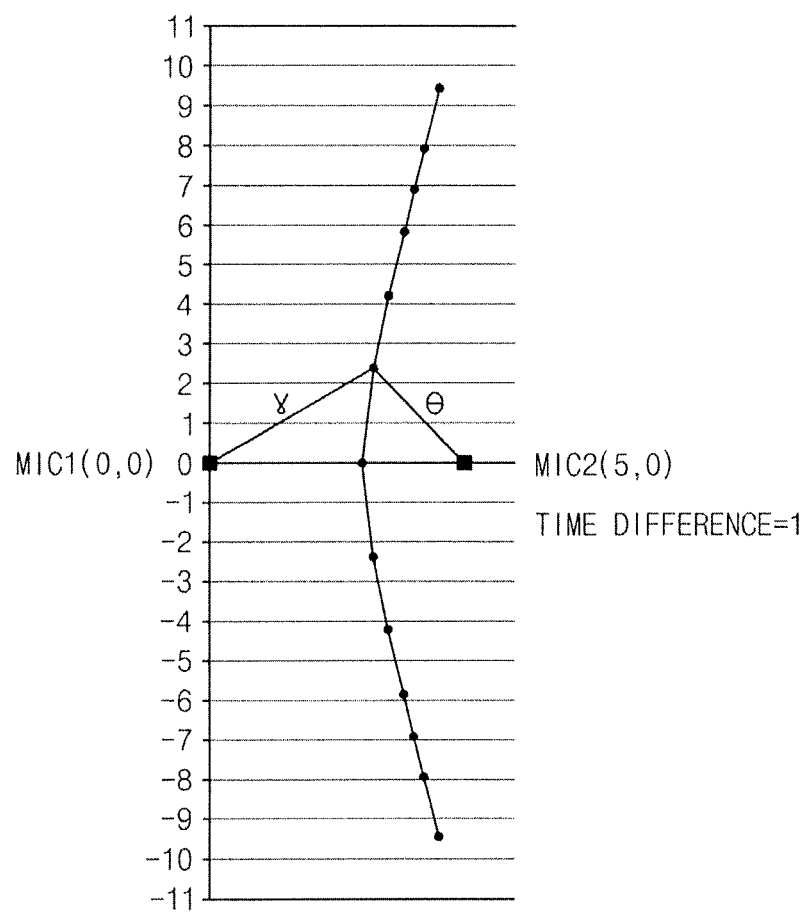
Figure 4:
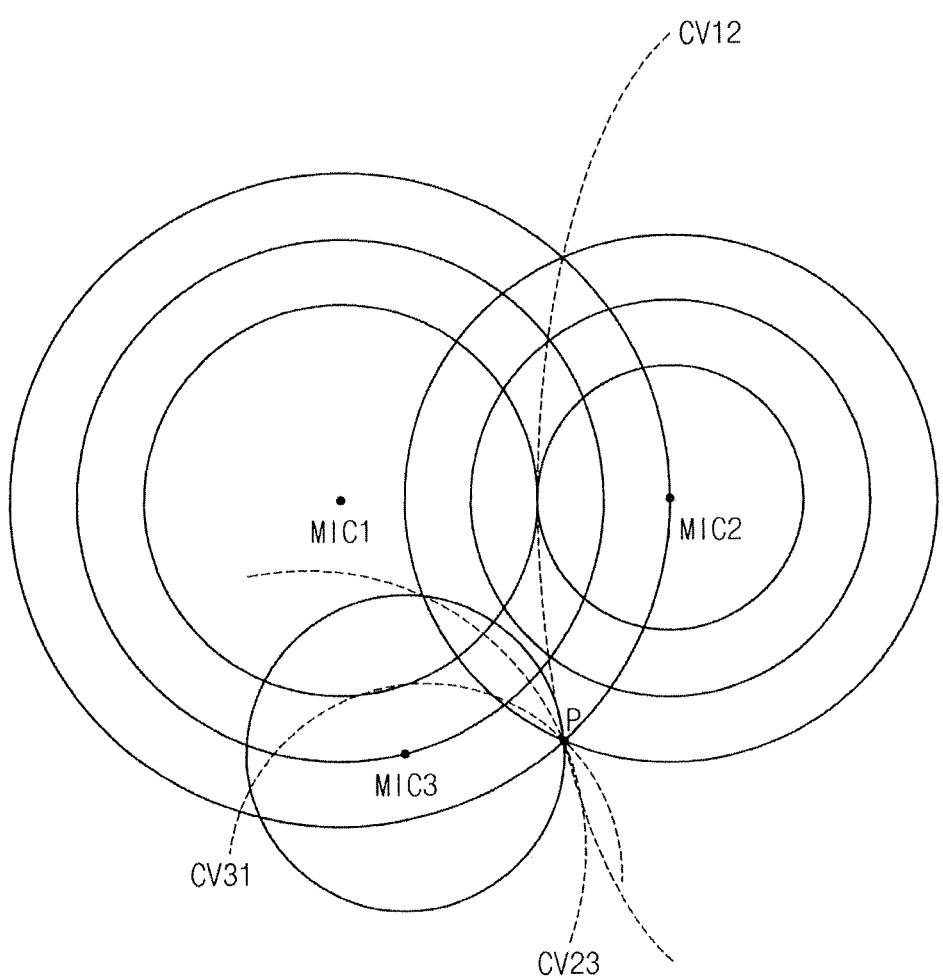
Figure 5:
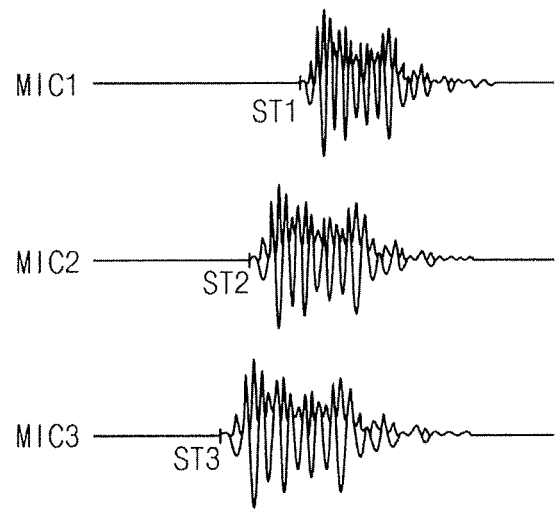

In FIGS. 2 and 3, the position of the abnormal operation is expected based on the time difference of an abnormal sound source signal of the first sound source inputting apparatus MIC1 and an abnormal sound source signal of the second sound source inputting apparatus MIC2. In FIGS. 4 and 5, the position of the abnormal operation is determined based on the time difference of the abnormal sound source signals when the first sound source inputting apparatus MIC1, the second sound source inputting apparatus MIC2, and the third sound source inputting apparatus MIC3 exist in the system.

In FIG. 2, positions P1, P2, P3, P4, and P5 having a first time difference between the start point of the first abnormal sound source signal of the first sound source signal input from the first sound source inputting apparatus MIC1 and the start point of the second abnormal sound source signal of the second sound source signal input from the second sound source inputting apparatus MIC2 forms a curve CV12.

When the time difference between the start point of the first abnormal sound source signal and the start point of the second abnormal sound source signal is the first time difference, the position of the abnormal operation may be expected to be on the curve CV12. The position of the abnormal operation according to the first time difference between the start point of the first abnormal sound source signal and the start point of the second abnormal sound source signal may be represented, for example, as a first hyperbolic function.

In FIG. 3, the coordinates of the first sound source inputting apparatus MIC1 is (x1, y1). The coordinates of the second sound source inputting apparatus MIC2 is (x2, y2). The distance between the position of the first sound source inputting apparatus MIC1 and the position of the abnormal operation is γ. The distance γ corresponds to the start point of the first abnormal sound source signal. The distance between the position of the second sound source inputting apparatus MIC2 and the position of the abnormal operation is θ. The distance θ corresponds to the start point of the second abnormal sound source signal. The difference between γ and θ is td, which corresponds to the first time difference. The first hyperbolic function may be represented, for example, by Equation 1, Equation 2, and Equation 3.

$$\gamma^2 = (x-x1)^2 + (y-y1)^2 \quad (1)$$

$$\theta^2 = (x-x2)^2 + (y-y2)^2 \quad (2)$$

$$td = \gamma - \theta \, (\gamma > \theta) \quad (3)$$

Here, the velocity of the sound source is used as a basis for converting the time of the sound source signal to a distance value. The velocity of the sound source may be, for example, about 340 m/s. The velocity of the sound source may be different in another embodiment, and, for example, may vary according to a gas constant, a specific heat ratio, and/or a temperature. Thus, in an exemplary embodiment, the temperature in the equipment may be measured, the velocity of the sound source may be compensated based on the measured temperature, and the position of the abnormal operation may be compensated.

When the coordinates of the first sound source inputting apparatus MIC1 is (0, 0), the coordinates of the second sound source inputting apparatus MIC2 is (5, 0). Also, the difference between γ and θ which corresponds to the first time difference is 1 unit in Equations 1 to 3, Equations 1 to 3 may be simplified as following Equation 4, Equation 5, and Equation 6.

$$\gamma = \sqrt{x^2 + y^2} \quad (4)$$

$$\theta = \sqrt{(x-5)^2 + y^2} \quad (5)$$

$$1 = \gamma - \theta \, (\Gamma > \theta) \quad (6)$$

Equations 4 to 6 may be converted to Equation 7, which represents a hyperbolic function. The position of the abnormal operation according to the first time difference between the start point of the first abnormal sound source signal and the start point of the second abnormal sound source signal is represented as Equation 7.

$$y = \pm \sqrt{24(x-2.5)^2 - 6} \quad (7)$$

Referring to FIG. 4, the position having a first time difference between the start point of the first abnormal sound source signal of the first sound source signal input from the first sound source inputting apparatus MIC1 and the start point of the second abnormal sound source signal of the second sound source signal input from the second sound source inputting apparatus MIC2 forms a curve CV12.

The position having a second time difference between the start point of the second abnormal sound source signal of the second sound source signal input from the second sound source input apparatus MIC2 and the start point of the third abnormal sound source signal of the third sound source signal input from the third sound source inputting apparatus MIC3 forms a curve CV23.

The position having a third time difference between the start point of the third abnormal sound source signal of the third sound source signal input from the third sound source inputting apparatus MIC3 and the start point of the first abnormal sound source signal of the first sound source signal input from the first sound source inputting apparatus MIC1 forms a curve CV31.

First to third hyperbolic curves CV12, CV23 and CV31 cross at a point, which corresponds to the position P of the abnormal operation.

In FIG. 5, the start point of the first abnormal sound source signal is ST1, the start point of the second abnormal sound source signal is ST2, and the start point of the third abnormal sound source signal is ST3. The position P of the abnormal operation is closest to the third sound source inputting apparatus MIC3, so that the start point ST3 of the third abnormal sound source signal is earlier than the start point ST1 of the first abnormal sound source signal and the start point ST2 of the second abnormal sound source signal.

The position P of the abnormal operation is farthest from the first sound source inputting apparatus MIC1 so that the start point ST1 of the first abnormal sound source signal is later than the start point ST2 of the second abnormal sound source signal and the start point ST3 of the third abnormal sound source signal.

The position determining part 300 may determine the position P of the abnormal operation based on the first time difference between the start point ST1 of the first abnormal sound source signal and the start point ST2 of the second abnormal sound source signal, the second time difference between the start point ST2 of the second abnormal sound source signal and the start point ST3 of the third abnormal sound source signal, and the third time difference between the start point ST3 of the third abnormal sound source signal and the start point ST1 of the first abnormal sound source signal.

An administrator of the equipment may inspect an element at the position P of the abnormal operation in order to prevent the occurrence of a defective product being produced due to the fault of the equipment, e.g., in advance of the produced being produced because it would be produced to have a defect.

The first to third sound source inputting apparatuses MIC1, MIC2, and MIC3 are in a plane. In one embodiment, the concept explained in the two dimensional plane may be applied to a three dimensional space.

Figure 6:
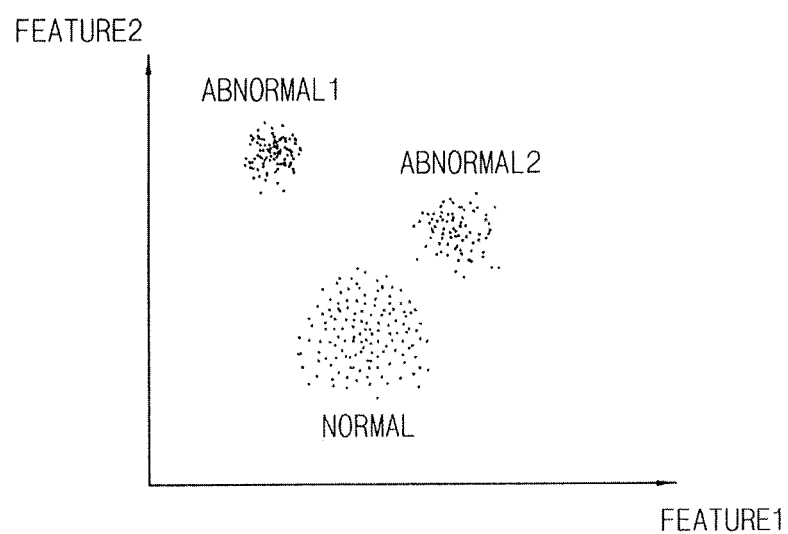
FIGS. 6 and 7 illustrate various embodiments of how a sound source analyzing part operates.
Figure 7:
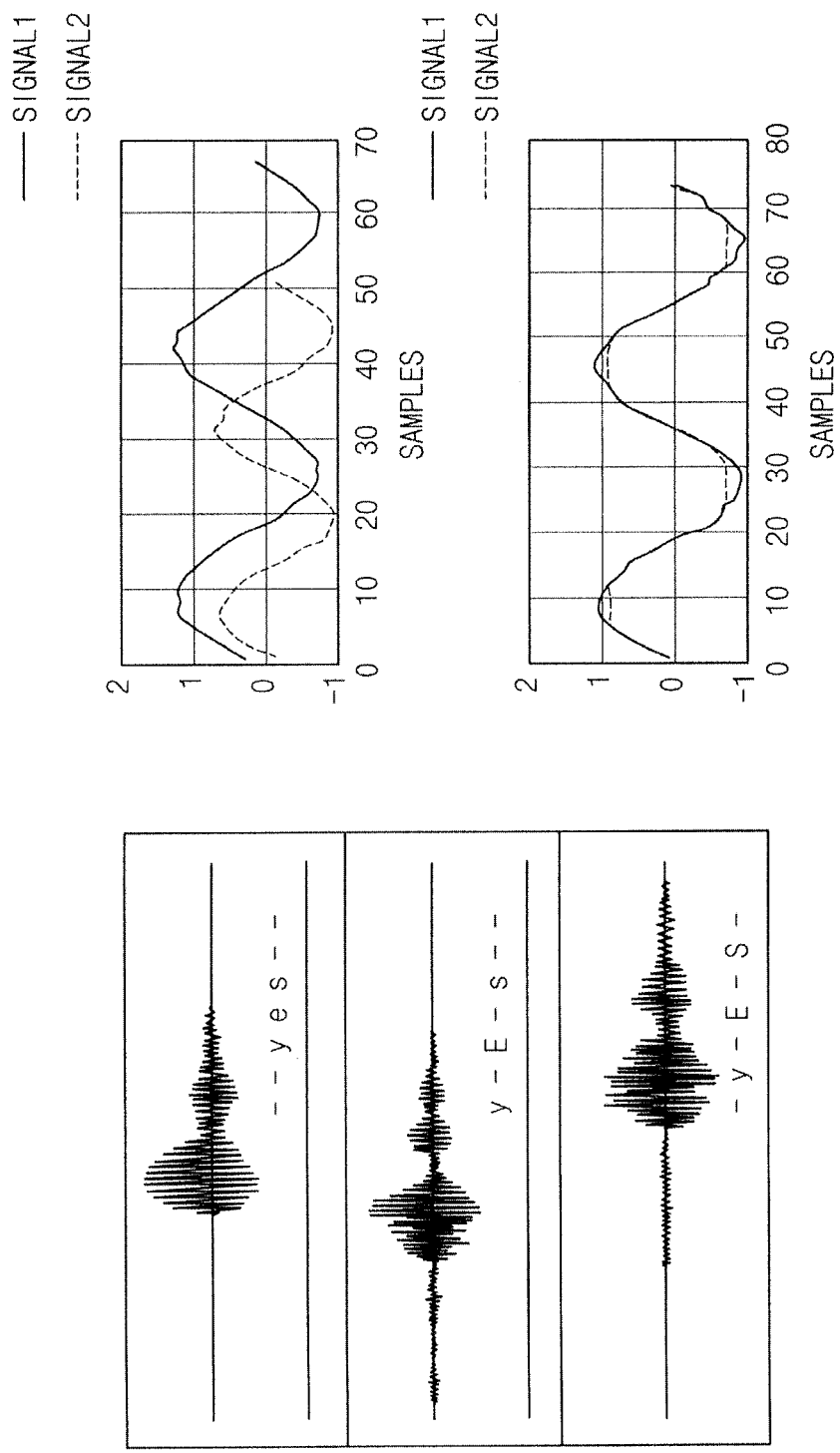

FIGS. 6 and 7 illustrate how the sound source analyzing part 200 of FIG. 1 may operate in accordance with one or more embodiments. Referring to FIG. 6, the sound source analyzing part 200 may determine the abnormal sound source signal by constructing a database including sound source features of the equipment. The sound source analyzing part 200 may determine the abnormal sound source signal based on deep learning of the sound source features of the equipment.

For example, the sound source analyzing part 200 may repetitively learn sample normal data NORMAL representing a normal operation of the equipment. The sound source analyzing part 200 may determine whether the sound source signal exceeds a normal data profile formed by the sample normal data NORMAL. When the sound source signal exceeds the normal data profile, the sound source signal may be determined as the abnormal sound source signal ABNORMAL1 and ABNORMAL2.

Referring to FIG. 7, the sound source analyzing part 200 may determine the abnormal sound source signal based on similarity between a sample abnormal data representing the abnormal operation of the equipment and the sound source signal.

For example, the sound source analyzing part 200 may determine the similarity between the sample abnormal data and the sound source signal using dynamic time warping. Elements in the equipment may be vibrated or driving conditions of the elements may be changed at a specific frequency. When the waveform of the sound source signal may be transferred, expanded, or reduced using the dynamic time warping, the similarity of the sample abnormal data and the sound source signal may be more accurately determined.

As shown in the left portion of FIG. 7, waveforms for the same pronunciation which are slightly different from each other may be determined as the similar waveforms using the dynamic time warping.

As shown in a right portion of FIG. 7, a waveform of SIGNAL2 may be horizontally transferred, vertically transferred, and expanded so that the timing of the waveform of SIGNAL2 may coincide with a timing of a waveform of SIGNAL1. Accordingly, the similarity of the waveform of SIGNAL1 and the waveform of SIGNAL2 may be determined.

According to the present exemplary embodiment, the abnormal operation of the equipment may be determined based on the sound source signals input from the first to third sound source inputting apparatuses MIC1, MIC2, and MIC3 and the position of the abnormal operation of the equipment may be determined based on the time differences between the first to third sound source signals input from the first to third sound source inputting apparatuses MIC1, MIC2, and MIC3.

Thus, a defective product may be prevented from being produced, and subsequently discarded, due to the fault of the equipment. As a result, manufacturing costs may be reduced and productivity may be enhanced.

Figure 8:
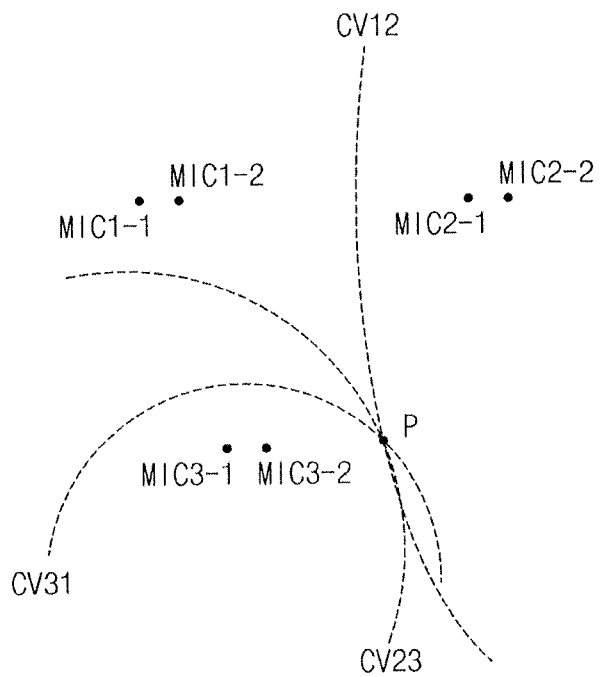
FIG. 8 illustrates another embodiment of how a position determining part operates.

FIG. 8 illustrating how the position determining part of a system for determining the position of a fault of equipment operates in accordance with another exemplary embodiment. The method and system of this exemplary embodiment may be substantially the same as the method and system explained referring to FIGS. 1 to 7, except for the sound source inputting apparatus.

Referring to FIGS. 1 and 8, the system for determining the position of the fault of the equipment includes a sound source inputting apparatus 100, a sound source analyzing part 200, and a position determining part 300. In one embodiment, the system for determining the position of the fault of the equipment may include a plurality of sound source inputting apparatuses 100. The sound source inputting apparatus(es) may be, for example, a microphone.

The sound source inputting apparatus(es) 100 are in the equipment, and sound source signals are respectively input to the sound source inputting apparatuses 100 in the equipment. The sound source inputting apparatus(es) 100 transmit the input sound source signals to the sound source analyzing part 200.

The sound source analyzing part 200 analyzes the sound source signals input to the sound source inputting apparatus 100. For example, the sound source analyzing part 200 analyzes at least one of the sound source signals to determine the abnormal operation of the equipment.

The position determining part 300 determines the position of the abnormal operation based on the time difference of the abnormal sound source signals.

In the present exemplary embodiment, the system of determining the position of the fault of the equipment may include a first sound source inputting apparatus MIC1-1, a second sound source inputting apparatus MIC1-2, a third sound source inputting apparatus MIC2-1, a fourth sound source inputting apparatus MIC2-2, a fifth sound source inputting apparatus MIC3-1, and a sixth sound source inputting apparatus MIC3-2. The first sound source inputting apparatus MIC1-1 and the second sound source inputting apparatus MIC1-2 may be adjacent to each other to form a pair. The third sound source inputting apparatus MIC2-1 and the fourth sound source inputting apparatus MIC2-2 may be adjacent to each other to form a pair. The fifth sound source inputting apparatus MIC3-1 and the sixth sound source inputting apparatus MIC3-2 may be adjacent to each other to form a pair.

The first sound source inputting apparatus MIC1-1 and the second sound source inputting apparatus MIC1-2 form a pair so that the accuracy of a first sound source signal input to the first sound source inputting apparatus MIC1-1 and the second sound source inputting apparatus MIC1-2 may be increased. The third sound source inputting apparatus MIC2-1 and the fourth sound source inputting apparatus MIC2-2 form a pair so that the accuracy of a second sound source signal input to the third sound source inputting apparatus MIC2-1 and the fourth sound source inputting apparatus MIC2-2 may be increased. The fifth sound source inputting apparatus MIC3-1 and the sixth sound source inputting apparatus MIC3-2 form a pair so that the accuracy of a third sound source signal input to the fifth sound source inputting apparatus MIC3-1 and the sixth sound source inputting apparatus MIC3-2 may be increased.

Referring again to FIG. 8, the position having a first time difference between a start point of a first abnormal sound source signal of the first sound source signal and a start point of a second abnormal sound source signal of the second sound source signal forms a hyperbolic curve CV12. The position having a second time difference between the start point of the second abnormal sound source signal of the second sound source signal and a start point of a third abnormal sound source signal of the third sound source signal forms a hyperbolic curve CV23. The position having a third time difference between the start point of the third abnormal sound source signal of the third sound source signal and the start point of the first abnormal sound source signal of the first sound source signal forms a hyperbolic curve CV31. The first to third hyperbolic curves CV12, CV23 and CV31 cross at a point, which corresponds to the position P of the abnormal operation.

An administrator of the equipment may inspect an element at the position P of the abnormal operation in order to prevent a defective product from being produced due to the fault of the equipment, e.g., in advance of the produced being produced.

According to the present exemplary embodiment, the abnormal operation of the equipment may be determined based on the sound source signals input from the first to sixth sound source inputting apparatuses MIC1-1, MIC1-2, MIC2-1, MIC2-2, MIC3-1, and MIC3-2. The position of the abnormal operation of the equipment may be determined based on the time differences between the first to third sound source signals inputted from the first to sixth sound source inputting apparatuses MIC1-1, MIC1-2, MIC2-1, MIC2-2, MIC3-1, and MIC3-2.

Thus, a defective product may be prevented from being produced, and subsequently from being discarded, due to the fault of the equipment. Thus, manufacturing costs and productivity of the product may be enhanced.

Figure 9:
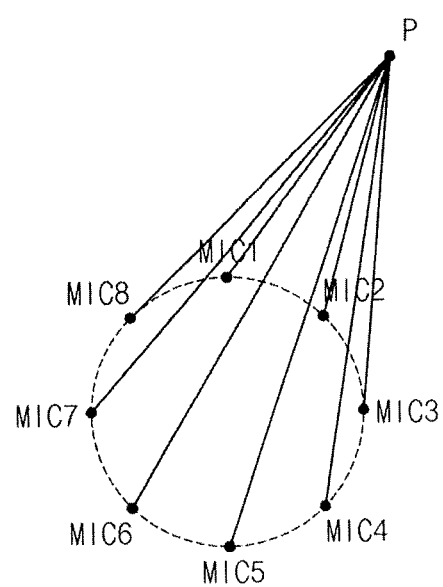
FIG. 9 illustrates another embodiment of how a position determining part operates.

FIG. 9 illustrates how a position determining part of a system for determining a position of a fault of equipment operates according to another exemplary embodiment. This method and system may be substantially the same as the method and system of explained referring to FIGS. 1 to 7, except for the sound source inputting apparatus.

Referring to FIGS. 1 and 9, the system for determining the position of the fault of the equipment includes a sound source inputting apparatus 100, a sound source analyzing part 200 and a position determining part 300. In one embodiment, the system may include a plurality of sound source inputting apparatuses 100. The sound source inputting apparatus(es) may be, for example, a microphone.

The sound source inputting apparatus(es) 100 are in the equipment, and sound source signals are respectively input to the sound source inputting apparatus(es) 100 in the equipment. The sound source inputting apparatuses 100 transmits the input sound source signals to the sound source analyzing part 200.

The sound source analyzing part 200 analyzes the sound source signals input to the sound source inputting apparatus 100. The sound source analyzing part 200 analyzes at least one of the sound source signals to determine the abnormal operation of the equipment.

The position determining part 300 determines the position of the abnormal operation based on the time difference of the abnormal sound source signals.

In the present exemplary embodiment, the system for determining the position of a fault of equipment may include an array of the sound source inputting apparatuses. The array of the sound source inputting apparatuses may include, for example, eight (or a different number of) sound source inputting apparatuses adjacent to one another.

The position P of the abnormal operation of the equipment may be determined based on the time differences between the sound source signals inputted from the array of the sound source inputting apparatuses. An administrator of the equipment may inspect an element at the position P of the abnormal operation in order to prevent a defective product from being produced due to the fault of the equipment.

According to the present exemplary embodiment, the abnormal operation of the equipment may be determined based on the sound source signals input from the array of the plurality of the sound source inputting apparatuses (e.g. MIC1 to MIC8). The position of the abnormal operation of the equipment may be determined based on the time differences between the sound source signals inputted from the array of the sound source inputting apparatuses.

Thus, a defective product may be prevented from being produced, and subsequently discarded, due to the fault of the equipment. As a result, manufacturing costs and productivity of the product may be enhanced.

Figure 10:
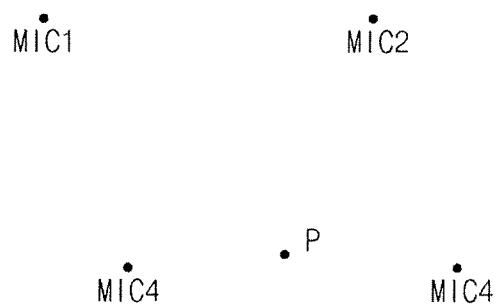
FIG. 10 illustrates another embodiment of how a position determining part operates.

FIG. 10 illustrates how a position determining part of a system for determining a position of a fault of equipment operates according to an exemplary embodiment. This method and system may be substantially the same as the method and system explained referring to FIGS. 1 to 7, except for the sound source inputting apparatus.

Referring to FIGS. 1 and 10, the system for determining the position of a fault of equipment includes a sound source inputting apparatus 100, a sound source analyzing part 200, and a position determining part 300. In one embodiment, the system may include a plurality of sound source inputting apparatuses 100. The sound source inputting apparatus(es) may be, for example, a microphone.

The sound source inputting apparatuses 100 are in the equipment, and sound source signals in the equipment are respectively input to the sound source inputting apparatuses 100. The sound source inputting apparatus(es) 100 transmit the input sound source signals to the sound source analyzing part 200.

The sound source analyzing part 200 analyzes the sound source signals input to the sound source inputting apparatus 100. The sound source analyzing part 200 analyzes at least one of the sound source signals to determine the abnormal operation of the equipment.

The position determining part 300 determines the position of the abnormal operation based on the time difference of the abnormal sound source signals.

In the present exemplary embodiment, the system for determining the position of the fault of equipment may include a first sound source inputting apparatus MIC1, a second sound source inputting apparatus MIC2, a third sound source inputting apparatus MIC3, and a fourth sound source inputting apparatus MIC4.

The first sound source inputting apparatus MIC1 receives a first sound source signal. The second sound source inputting apparatus MIC2 receives a second sound source signal. The third sound source inputting apparatus MIC3 receives a third sound source signal. The fourth sound source inputting apparatus MIC4 receives a fourth sound source signal.

Six time differences may be obtained between two of a first abnormal sound source signal of the first sound source signal, a second abnormal sound source signal of the second sound source signal, a third abnormal sound source signal of the third sound source signal, and a fourth abnormal sound source signal of the fourth sound source signal. Six hyperbolic curves may be obtained based on the six time differences. The six hyperbolic curves may ideally cross at a point, which corresponds to the position P of the abnormal operation.

The system for determining the position of the fault of the equipment of the present exemplary embodiment may include more of the sound source inputting apparatuses than those of the system explained referring to FIGS. 1 to 7. As a result, the accuracy of determining the position P of the abnormal operation may be enhanced. Also, the system of this embodiment includes four sound source inputting apparatuses, but may include a different number (e.g., five or more) sound source inputting apparatuses in another embodiment.

An administrator of the equipment may inspect an element at the position P of the abnormal operation in order to prevent a defective product from being produced due to the fault of the equipment.

According to the present exemplary embodiment, abnormal operation of the equipment may be determined based on the sound source signals input from the first to fourth sound source inputting apparatuses MIC1, MIC2, MIC3, and MIC4. The position of the abnormal operation of the equipment may be determined based on the time differences between the first to fourth sound source signals input from the first to fourth sound source inputting apparatuses MIC1, MIC2, MIC3, and MIC4.

Thus, a defective product may be prevented from being produced, and subsequently from being discarded, due to the fault of the equipment. As a result, manufacturing costs and productivity of the product may be enhanced.

Figure 11:
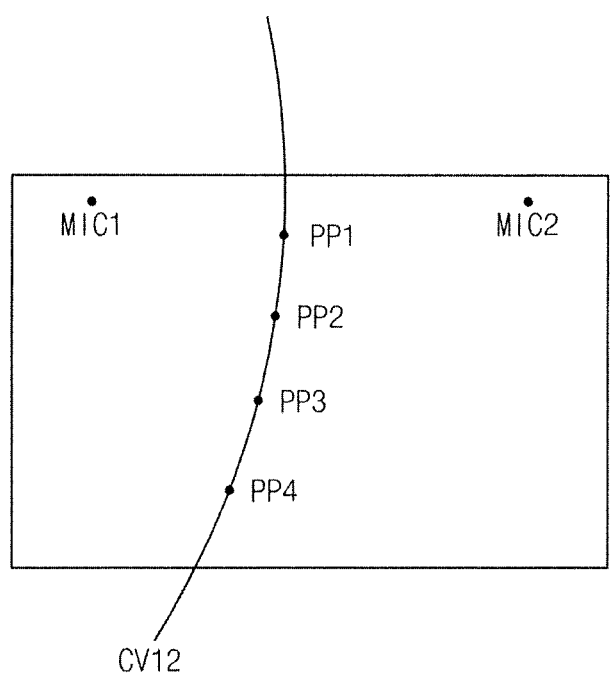
FIG. 11 illustrates another embodiment of how a position determining part operates.

FIG. 11 illustrates how a position determining part of a system for determining a position of a fault of equipment operates according to another exemplary embodiment. The method and system of this embodiment may be substantially the same as the method and system explained referring to FIGS. 1 to 7, except for the sound source inputting apparatus and the position determining part. FIGS. 12A to 12D illustrating embodiments of the position determining part of the system of determining the position of the fault of the equipment of FIG. 11.

Referring to FIGS. 1, 11, and 12A to 12D, the system includes a sound source inputting apparatus 100, a sound source analyzing part 200, and a position determining part 300. In one embodiment, the system may include a plurality of sound source inputting apparatuses 100. The sound source inputting apparatus(es) may be, for example, a microphone.

The sound source inputting apparatuses 100 are in the equipment, and sound source signals in the equipment are respectively input to the sound source inputting apparatuses 100. The sound source inputting apparatuses 100 transmits the input sound source signals to the sound source analyzing part 200.

The sound source analyzing part 200 analyzes the sound source signals input to the sound source inputting apparatus 100. The sound source analyzing part 200 analyzes at least one of the sound source signals to determine the abnormal operation of the equipment.

The position determining part 300 determines the position of the abnormal operation based on the time difference of the abnormal sound source signals.

In the present exemplary embodiment, the system for determining the position of the fault of the equipment may include only a first sound source inputting apparatus MIC1 and a second sound source inputting apparatus MIC2. The first sound source inputting apparatus MIC1 is at a first end portion (e.g. a left side of FIG. 11) of a first axis (e.g. a horizontal axis of FIG. 11) and a first end portion (e.g. an upper side of FIG. 11) of a second axis (e.g. a vertical axis of FIG. 11) in the equipment. The second sound source inputting apparatus MIC2 is at a second end portion (e.g. a right side of FIG. 11) of the first axis (e.g. the horizontal axis of FIG. 11) and the first end portion (e.g. the upper side of FIG. 11) of the second axis (e.g. the vertical axis of FIG. 11) in the equipment.

When the system of determining the position of the fault of the equipment includes only the two sound source inputting apparatuses, the two sound source inputting apparatuses may be in the first end portion (e.g. the upper side of FIG. 11) of second first axis in the equipment. When the two sound source inputting apparatuses are in the first end portion (e.g. the upper side of FIG. 11) of the second axis in the equipment, the hyperbolic curve (defined by the time difference between the abnormal sound source signal of the first sound source inputting apparatus and the abnormal sound source signal of the second sound source inputting apparatus) may only decrease along the second axis or may only increase along the second axis. Thus, the position of the fault may be easily determined.

When the system of determining the position of the fault of the equipment includes only the two sound source inputting apparatuses, the two sound source inputting apparatuses may be in a central portion of the second axis in the equipment. When the two sound source inputting apparatuses are in the central portion of the second axis in the equipment, the hyperbolic curve (defined by the time difference between the abnormal sound source signal of the first sound source inputting apparatus and the abnormal sound source signal of the second sound source inputting apparatus) may decrease and then increase along the second axis or may increase and then decrease along the second axis. Thus, determining the position of the fault may be relatively difficult.

In FIG. 11, the positions PP1, PP2, PP3 and PP4 having a first time difference between the start point of the first abnormal sound source signal of the first sound source signal input from the first sound source inputting apparatus MIC1 and the start point of the second abnormal sound source signal of the second sound source signal input from the second sound source inputting apparatus MIC2 forms a curve CV12. The position determining part 300 may determine one of elements in the equipment on the curve CV12 as the abnormally operating element.

The position determining part 300 may determine a moving direction of the abnormal operation based on a start time difference between the start point of the first abnormal sound source signal of the first sound source signal and the start point of the second abnormal sound source signal of the second sound source signal and an end time difference between an end point of the first abnormal sound source signal of the first sound source signal and an end point of the second abnormal sound source signal of the second sound source signal.

When the start point of the first abnormal sound source signal is earlier than the start point of the second abnormal sound source signal, the position determining part 300 may determine that a start position of the abnormal operation is closer to the first sound source inputting apparatus MIC1 than the second sound source inputting apparatus MIC2. When the start point of the second abnormal sound source signal is earlier than the start point of the first abnormal sound source signal, the position determining part 300 may determine that the start position of the abnormal operation is closer to the second sound source inputting apparatus MIC2 than the first sound source inputting apparatus MIC1.

When the end point of the first abnormal sound source signal is earlier than the end point of the second abnormal sound source signal, the position determining part 300 may determine that an end position of the abnormal operation is closer to the first sound source inputting apparatus MIC1 than the second sound source inputting apparatus MIC2. When the end point of the second abnormal sound source signal is earlier than the end point of the first abnormal sound source signal, the position determining part 300 may determine that the end position of the abnormal operation is closer to the second sound source inputting apparatus MIC2 than the first sound source inputting apparatus MIC1.

As explained above, the moving direction of the abnormal operation may be determined based on the start point and the end point of the abnormal sound source signal. Based on the position information CV12 of the start point of the abnormal sound source signal and the moving direction of the abnormal operation, the abnormally operating element in the equipment may be determined.

In FIGS. 12A to 12D, the moving direction of the abnormal operation is along the first axis and the second axis for convenience of explanation. The elements in the equipment may move along orthogonal coordinate axes in many practical cases. Thus, when the first sound source inputting apparatus and the second sound source inputting apparatus are in the orthogonal coordinates, an environment equal to the environment in FIGS. 12A to 12D may be reproduced.

Figure 12A:
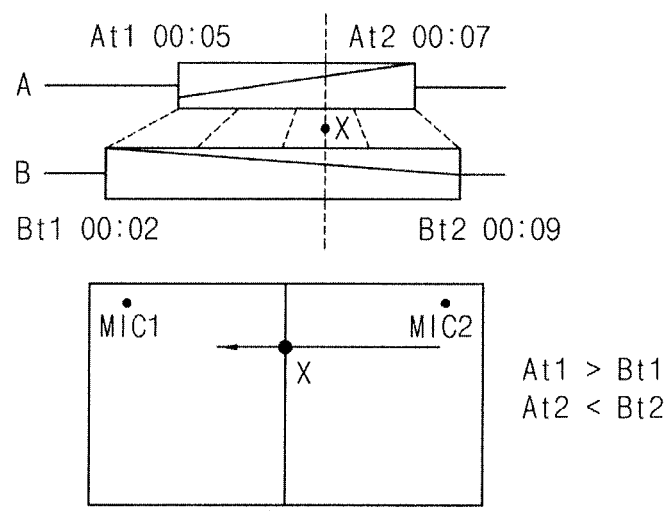
FIGS. 12A to 12D illustrate additional embodiments of how position determining part operates.

Referring to FIG. 12A, a start point At1 of the first abnormal sound source signal is 00:05 and an end point At2 of the first abnormal sound source signal is 00:07. In addition, a start point Bt1 of the second abnormal sound source signal is 00:02 and an end point Bt2 of the second abnormal sound source signal is 00:09.

The start point Bt1 of the second abnormal sound source signal is earlier than the start point At1 of the first abnormal sound source signal. Thus, the start point of the abnormal operation is closer to the second sound source inputting apparatus MIC2 than the first sound source inputting apparatus MIC1.

The end point At2 of the first abnormal sound source signal is earlier than the end point Bt2 of the second abnormal sound source signal. Thus, the end point of the abnormal operation is closer to the first sound source inputting apparatus MIC1 than the second sound source inputting apparatus MIC2.

The time difference between the start point At1 of the first abnormal sound source signal and the start point Bt1 of the second abnormal sound source signal is three seconds and the time difference between the end point Bt2 of the second abnormal sound source signal and the end point At2 of the first abnormal sound source signal is two seconds. Therefore, the distance between the start point of the abnormal operation and the second sound source inputting apparatus MIC2 is less than the distance between the end point of the abnormal operation and the first sound source inputting apparatus MIC1.

In FIG. 12A, the position determining part 300 may determine the abnormal operation is generated from the second end portion of the first axis to the first end portion of the first axis with moving along the first axis.

In FIG. 12A, the position of X corresponds to where the same sound source is input to the first sound source inputting apparatus MIC1 and the second sound source inputting apparatus MIC2. The position of X may be a central portion of the first axis in the equipment.

Figure 12B:
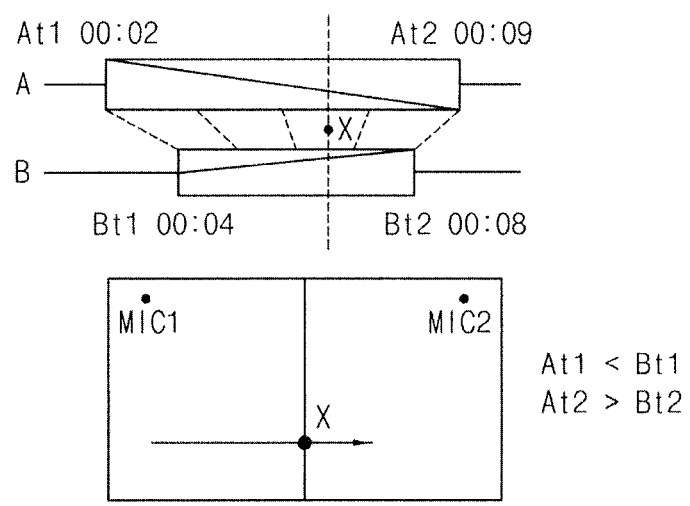

Referring to FIG. 12B, a start point At1 of the first abnormal sound source signal is 00:02 and an end point At2 of the first abnormal sound source signal is 00:09. In addition, a start point BO of the second abnormal sound source signal is 00:04 and an end point Bt2 of the second abnormal sound source signal is 00:08.

The start point At1 of the first abnormal sound source signal is earlier than the start point Bt1 of the second abnormal sound source signal. Thus, the start point of the abnormal operation is closer to the first sound source inputting apparatus MIC1 than the second sound source inputting apparatus MIC2.

The end point Bt2 of the second abnormal sound source signal is earlier than the end point At2 of the first abnormal sound source signal. Thus, the end point of the abnormal operation is closer to the second sound source inputting apparatus MIC2 than the first sound source inputting apparatus MIC1.

In addition, the time difference between the start point Bt1 of the second abnormal sound source signal and the start point At1 of the first abnormal sound source signal is two seconds and the time difference between the end point At2 of the first abnormal sound source signal and the end point Bt2 of the second abnormal sound source signal is a second. Therefore, the distance between the start point of the abnormal operation and the first sound source inputting apparatus MIC1 is less than the distance between the end point of the abnormal operation and the second sound source inputting apparatus MIC2.

In FIG. 12B, the position determining part 300 may determine the abnormal operation is generated from the first end portion of the first axis to the second end portion of the first axis with moving along the first axis.

The start time difference and the end time difference are respectively three seconds and two seconds in FIG. 12A. The start time difference and the end time difference are respectively two seconds and a second in FIG. 12B. This indicates that the abnormal operation in FIG. 12A is generated closer to the first and second sound source inputting apparatuses MIC1 and MIC2 than the abnormal operation in FIG. 12B.

In FIG. 12B, a position of X corresponds to where the same sound source is inputted to the first sound source inputting apparatus MIC1 and the second sound source inputting apparatus MIC2. The position of X may be a central portion of the first axis in the equipment.

Figure 12C:
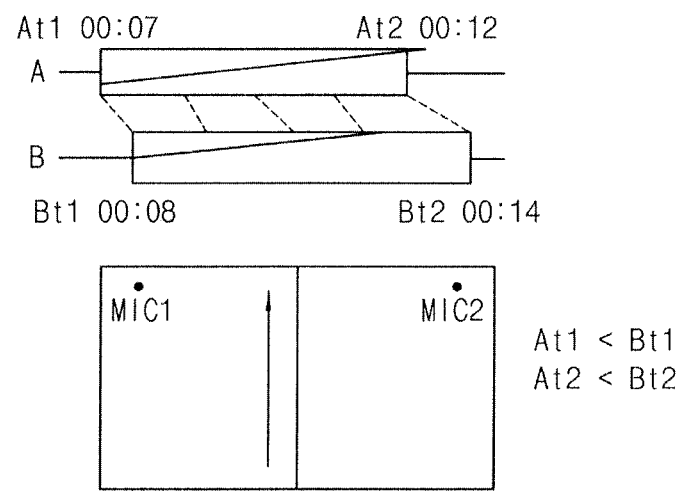

Referring to FIG. 12C, a start point At1 of the first abnormal sound source signal is 00:07 and an end point At2 of the first abnormal sound source signal is 00:12. In addition, a start point Bt1 of the second abnormal sound source signal is 00:08 and an end point Bt2 of the second abnormal sound source signal is 00:14.

The start point At1 of the first abnormal sound source signal is earlier than the start point Bt1 of the second abnormal sound source signal. Thus, the start point of the abnormal operation is closer to the first sound source inputting apparatus MIC1 than the second sound source inputting apparatus MIC2.

The end point At2 of the first abnormal sound source signal is earlier than the end point Bt2 of the second abnormal sound source signal. Thus, the end point of the abnormal operation is closer to the first sound source inputting apparatus MIC1 than the second sound source inputting apparatus MIC2. In this case, the position determining part 300 may determine the abnormal operation is generated by moving along the second axis, not along the first axis.

In addition, the time difference between the start point Bt1 of the second abnormal sound source signal and the start point At1 of the first abnormal sound source signal is a second and the time difference between the end point Bt2 of the second abnormal sound source signal and the end point At2 of the first abnormal sound source signal is two seconds.

The end point difference is greater than the start point difference. Thus, the end position of the abnormal operation is closer to the first and second sound source inputting apparatuses MIC1 and MIC2 than the start position of the abnormal operation. The position determining part 300 may determine the abnormal operation is generated from the second end portion (e.g., the lower side in FIG. 12C) of the second axis to the first end portion (e.g., the upper side in FIG. 12C) of the second axis by moving along the second axis.

Figure 12D:
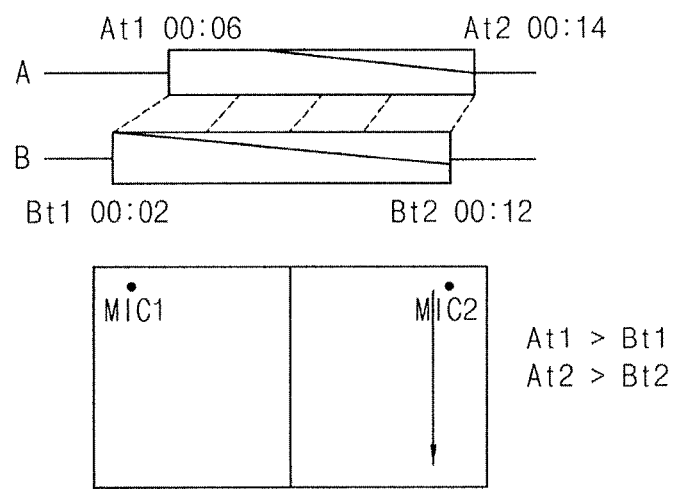

Referring to FIG. 12D, a start point At1 of the first abnormal sound source signal is 00:06 and an end point At2 of the first abnormal sound source signal is 00:14. In addition, a start point BO of the second abnormal sound source signal is 00:02 and an end point Bt2 of the second abnormal sound source signal is 00:12.

The start point Bt1 of the second abnormal sound source signal is earlier than the start point At1 of the first abnormal sound source signal. Thus, the start point of the abnormal operation is closer to the second sound source inputting apparatus MIC2 than the first sound source inputting apparatus MIC1.

The end point Bt2 of the second abnormal sound source signal is earlier than the end point At2 of the first abnormal sound source signal so that the end point of the abnormal operation is closer to the second sound source inputting apparatus MIC2 than the first sound source inputting apparatus MIC1. In this case, the position determining part 300 may determine the abnormal operation is generated by moving along the second axis, not along the first axis.

In addition, the time difference between the start point At1 of the first abnormal sound source signal and the start point Bt1 of the second abnormal sound source signal is four seconds and the time difference between the end point At2 of the first abnormal sound source signal and the end point Bt2 of the second abnormal sound source signal is two seconds.

The start point difference is greater than the end point difference so that the start position of the abnormal operation is closer to the first and second sound source inputting apparatuses MIC1 and MIC2 than the end position of the abnormal operation. The position determining part 300 may determine the abnormal operation is generated from the first end portion (e.g., the upper side in FIG. 12D) of the second axis to the second end portion (e.g., the lower side in FIG. 12D) of the second axis with moving along the second axis.

The start time difference and the end time difference are respectively a second and two seconds in FIG. 12C. The start time difference and the end time difference are respectively four seconds and two seconds in FIG. 12D. This indicates that the distance of the path of the abnormal operation from the first sound source inputting apparatus MIC1 in FIG. 12C is farther than the distance of the abnormal operation from the second sound source inputting apparatus MIC2 in FIG. 12D.

An administrator of the equipment may inspect an element at the position CV12 of the abnormal operation and in the moving direction of the abnormal operation, in order to prevent a defective product from being produced due to the equipment fault.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The sound source analyzing parts, position determining parts, and other signal generating, signal providing, and signal processing features of the embodiments disclosed herein may be implemented in non-transitory logic which, for example, may include hardware, software, or both. When implemented at least partially in hardware, the sound source analyzing parts, position determining parts, and other signal generating, signal providing, and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the sound source analyzing parts, position determining parts, and other signal generating, signal providing, and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

The various operations of methods described above may be performed by any suitable means capable of performing the operations, such as various hardware and/or software component(s), circuits, and/or module(s).

The software may comprise an ordered listing of executable instructions for implementing logical functions, and can be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

By way of summation and review, attempts have been made to correct faults in equipment. However, those attempts are performed only after the fault has occurred in the equipment. This slows down the manufacturing process and introduces other inefficiencies such as but not limited to increased costs.

In accordance with one or more of the aforementioned embodiments, a system and method are provided which determines the existence of a fault in equipment before the product is manufactured with a defect caused by the defective equipment. For example, abnormal operation of equipment may be determined based on the sound source signals from first and second sound source inputting apparatuses. The position and moving direction of the abnormal operation of the equipment may be determined based on the start time difference and the end time difference between the first and second sound source signals inputted from the first and second sound source inputting apparatuses.

Thus, a defective product may be prevented from being produced, and subsequently discarded, due to a fault of the equipment. Additionally, manufacturing costs and productivity of the product may be enhanced. The embodiments described herein may be applied to various manufacturing types of manufacturing equipment and systems including but not limited to semiconductor manufacturing equipment and systems. Thus, the embodiments described herein do not merely listen to a sound and determine a defect. Rather, the system and method embodiments described herein recite a specific Manner of determining fault in equipment unlike other systems and methods that have been proposed, which more effectively determines fault in equipment so that the fault of the equipment may be corrected or the equipment replaced before the products are actually manufactured, thereby saving costs and streamlining efficiency.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, various changes in form and details may be made without departing from the spirit and scope of the embodiments set forth in the claims.

What is claimed is:

1. A method for determining a position of a fault of equipment, the method comprising:
receiving a plurality of sound source signals from a plurality of sound source inputting apparatuses;
determining an abnormal operation of the equipment by analyzing at least one sound source signal among the plurality of sound source signals;
extracting abnormal sound source signals from the at least one sound source signal, the abnormal sound source signals being indicative of the abnormal operation of the equipment; and
determining a position of the abnormal operation of the equipment based on a time difference between the abnormal sound source signals,
wherein:
the plurality of sound source inputting apparatuses include a first sound source inputting apparatus and a second sound source inputting apparatus, and the at least one sound source signal includes a first sound source signal and a second sound source signal,
the first sound source signal is received from the first sound source inputting apparatus, and the second sound source signal is received from the second sound source inputting apparatus,
the first sound source inputting apparatus is at a first end portion of a first axis and a first end portion of a second axis in the equipment, and
the second sound source inputting apparatus is at a second end portion of the first axis and the first end portion of the second axis in the equipment,
wherein determining the position of the abnormal operation of the equipment is performed based on:
a start time difference between a start point of a first abnormal sound source signal of the first sound source signal and a start point of a second abnormal sound source signal of the second sound source signal, and
wherein a moving direction of the abnormal operation of the equipment is determined based on:
the start time difference between the start point of the first abnormal sound source signal and the start point of the second abnormal sound source signal, and
an end time difference between an end point of the first abnormal sound source signal and an end point of the second abnormal sound source signal.

2. The method as claimed in claim 1, wherein determining the abnormal operation of the equipment includes determining a similarity between a sample abnormal data indicative of the abnormal operation of the equipment and the at least one sound source signal.

3. The method as claimed in claim 1, wherein determining the abnormal operation of the equipment includes:
learning sample normal data indicative of a normal operation of the equipment repetitively; and
determining whether the at least one sound source signal exceeds a normal data profile corresponding to the sample normal data.

4. The method as claimed in claim 1, wherein:
the plurality of sound source inputting apparatuses include the first sound source inputting apparatus, the second sound source inputting apparatus, and a third sound source inputting apparatus, and
the first sound source signal is received from the first sound source inputting apparatus, the second sound source signal is received from the second sound source inputting apparatus, and a third sound source signal is received from the third sound source inputting apparatus.

5. The method as claimed in claim 4, wherein determining the position of the abnormal operation of the equipment is performed based on:
the start time difference between the start point of the first abnormal sound source signal and the start point of the second abnormal sound source signal,
a second time difference between the start point of the second abnormal sound source signal and a start point of a third abnormal sound source signal of the third sound source signal, and
a third time difference between the start point of the third abnormal sound source signal and the start point of the first abnormal sound source signal.

6. The method as claimed in claim 5, wherein the position of the abnormal operation of the equipment determined based on the start time difference between the start point of the first abnormal sound source signal and the start point of the second abnormal sound source signal corresponds to a first hyperbolic function.

7. The method as claimed in claim 6, wherein:
coordinates of the first sound source inputting apparatus are (x1, y1), coordinates of the second sound source inputting apparatus are (x2, y2),
a distance between a position of the first sound source inputting apparatus and a position of the abnormal operation of the equipment is γ, the distance γ corresponding to the start point of the first abnormal sound source signal,
a distance between a position of the second sound source inputting apparatus and the position of the abnormal operation of the equipment is θ, the distance θ corresponding to the start point of the second abnormal sound source signal, and
a difference between γ and θ is td, wherein the difference td corresponds to the start time difference between the start point of the first abnormal sound source signal and the start point of the second abnormal sound source signal and wherein the first hyperbolic function is obtained by $\gamma^2=(x-x1)^2+(y-y1)^2$, $\theta^2=(x-x2)^2+(y-y2)^2$ and td=γ−θ(γ>θ).

8. The method as claimed in claim 1, wherein determining the position of the abnormal operation of the equipment includes:
determining that a start position of the abnormal operation of the equipment is closer to the first sound source inputting apparatus than the second sound source inputting apparatus, when the start point of the first abnormal sound source signal is earlier than the start point of the second abnormal sound source signal.

9. The method as claimed in claim 8, wherein determining the position of the abnormal operation of the equipment includes:
determining that an end position of the abnormal operation of the equipment is closer to the first sound source inputting apparatus than the second sound source inputting apparatus, when the end point of the first abnormal sound source signal is earlier than the end point of the second abnormal sound source signal.

10. The method as claimed in claim 1, wherein:
determining the position of the abnormal operation of the equipment includes determining that the abnormal operation of the equipment is generated from the second end portion of the first axis to the first end portion of the first axis by moving along the first axis, when the abnormal operation of the equipment is generated along the first axis,
the start point of the second abnormal sound source signal is earlier than the start point of the first abnormal sound source signal, and
the end point of the first abnormal sound source signal is earlier than the end point of the second abnormal sound source signal.

11. The method as claimed in claim 1, wherein:
determining the position of the abnormal operation of the equipment includes determining that the abnormal operation of the equipment is generated from the first end portion of the first axis to the second end portion of the first axis by moving along the first axis, when the abnormal operation of the equipment is generated along the first axis,
the start point of the first abnormal sound source signal is earlier than the start point of the second abnormal sound source signal, and
the end point of the second abnormal sound source signal is earlier than the end point of the first abnormal sound source signal.

12. The method as claimed in claim 1, wherein:
determining the position of the abnormal operation of the equipment includes determining that the abnormal operation of the equipment is generated at a position closer to the first end portion of the first axis than the second end portion of the first axis by moving along the second axis when the abnormal operation of the equipment is generated along the second axis,
the start point of the first abnormal sound source signal is earlier than the start point of the second abnormal sound source signal, and
the end point of the first abnormal sound source signal is earlier than the end point of the second abnormal sound source signal.

13. The method as claimed in claim 12, wherein:
determining the position of the abnormal operation of the equipment includes determining that the abnormal operation of the equipment is generated at a position closer to the first end portion of the first axis than the second end portion of the first axis from a second end portion of the second axis to the first end portion of the second axis by moving along the second axis when the abnormal operation of the equipment is generated along the second axis,
the start point of the first abnormal sound source signal is earlier than the start point of the second abnormal sound source signal,
the end point of the first abnormal sound source signal is earlier than the end point of the second abnormal sound source signal, and
the start time difference between the start point of the first abnormal sound source signal and the start point of the second abnormal sound source signal is less than the end time difference between the end point of the first abnormal sound source signal and the end point of the second abnormal sound source signal.

14. The method as claimed in claim 1,
wherein determining the abnormal operation of the equipment includes determining a similarity between a sample abnormal data, which is indicative of the abnormal operation of the equipment, and the at least one sound source signal, and
determining the similarity between the sample abnormal data and the at least one sound source signal includes performing dynamic time warping on at least one of the sample abnormal data and the at least one sound source signal, whereby peaks of the sample abnormal data and the at least one sound source signal are aligned.

15. A system for determining a position of a fault of equipment, the system comprising:
a plurality of sound source inputting apparatuses;
a sound source analyzer to determine an abnormal operation of the equipment, the sound source analyzer to analyze at least one sound source signal among a plurality of sound source signals received from the plurality of sound source inputting apparatuses; and
position determining logic to determine a position of the abnormal operation of the equipment based on a time difference between abnormal sound source signals extracted from the at least one sound source signal and which indicate the abnormal operation of the equipment,
wherein:
the plurality of sound source inputting apparatuses include a first sound source inputting apparatus and a second sound source inputting apparatus, and the at least one sound source signal includes a first sound source signal and a second sound source signal, the first sound source signal is received from the first sound source inputting apparatus, and the second sound source signal is received from the second sound source inputting apparatus, the first sound source inputting apparatus is at a first end portion of a first axis and a first end portion of a second axis in the equipment, and the second sound source inputting apparatus is at a second end portion of the first axis and the first end portion of the second axis in the equipment, wherein the position determining logic determines the position of the abnormal operation of the equipment based on:

a start time difference between a start point of a first abnormal sound source signal of the first sound source signal and a start point of a second abnormal sound source signal of the second sound source signal, and wherein the position determining logic determines a moving direction of the abnormal operation of the equipment based on:

the start time difference between the start point of the first abnormal sound source signal and the start point of the second abnormal sound source signal, and an end time difference between an end point of the first abnormal sound source signal and an end point of the second abnormal sound source signal.

16. The system as claimed in claim 15, wherein the sound source analyzer is to learn sample normal data indicative of a normal operation of the equipment repetitively and is to determine whether the at least one sound source signal exceeds a normal data profile corresponding to the sample normal data to determine the abnormal operation of the equipment.

17. The system as claimed in claim 15, wherein:

the plurality of sound source inputting apparatuses include the first sound source inputting apparatus, the second sound source inputting apparatus, and a third sound source inputting apparatus, the first sound source signal is received from the first sound source inputting apparatus, the second sound source signal is received from the second sound source inputting apparatus, and a third sound source signal is received from the third sound source inputting apparatus, and the position determining logic is to determine the position of the abnormal operation of the equipment based on:

the start time difference between the start point of first abnormal sound source signal and the start point of a second abnormal sound source signal, a second time difference between the start point of the second abnormal sound source signal and a start point of a third abnormal sound source signal of the third sound source signal, and a third time difference between the start point of the third abnormal sound source signal and the start point of the first abnormal sound source signal.

18. A non-transitory, computer-readable medium storing instructions which, when executed, cause a processor to perform a method of determining a position of a fault of equipment, the method comprising:

receiving a plurality of sound source signals from a plurality of sound source inputting apparatuses;

determining an abnormal operation of the equipment by analyzing at least one sound source signal among the plurality of sound source signals;

extracting abnormal sound source signals from the at least one sound source signal, the abnormal sound source signals being indicative of the abnormal operation of the equipment; and determining a position of the abnormal operation of the equipment based on a time difference between the abnormal sound source signals, wherein:

the plurality of sound source inputting apparatuses include a first sound source inputting apparatus and a second sound source inputting apparatus, and the at least one sound source signal includes a first sound source signal and a second sound source signal, the first sound source signal is received from the first sound source inputting apparatus, and the second sound source signal is received from the second sound source inputting apparatus, the first sound source inputting apparatus is at a first end portion of a first axis and a first end portion of a second axis in the equipment, and the second sound source inputting apparatus is at a second end portion of the first axis and the first end portion of the second axis in the equipment, wherein determining the position of the abnormal operation of the equipment is performed based on:

a start time difference between a start point of a first abnormal sound source signal of the first sound source signal and a start point of a second abnormal sound source signal of the second sound source signal, and wherein a moving direction of the abnormal operation of the equipment is determined based on:

the start time difference between the start point of the first abnormal sound source signal and the start point of the second abnormal sound source signal, and an end time difference between an end point of the first abnormal sound source signal and an end point of the second abnormal sound source signal.

* * * * *